July 3, 1928.
A. Y. DODGE
BRAKE MECHANISM
Filed Nov. 2, 1925
1,675,536
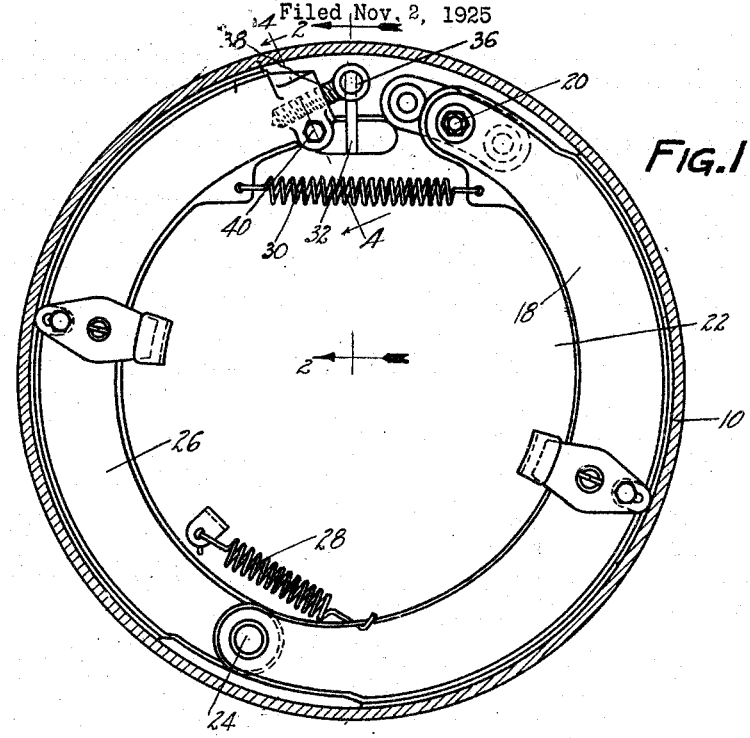
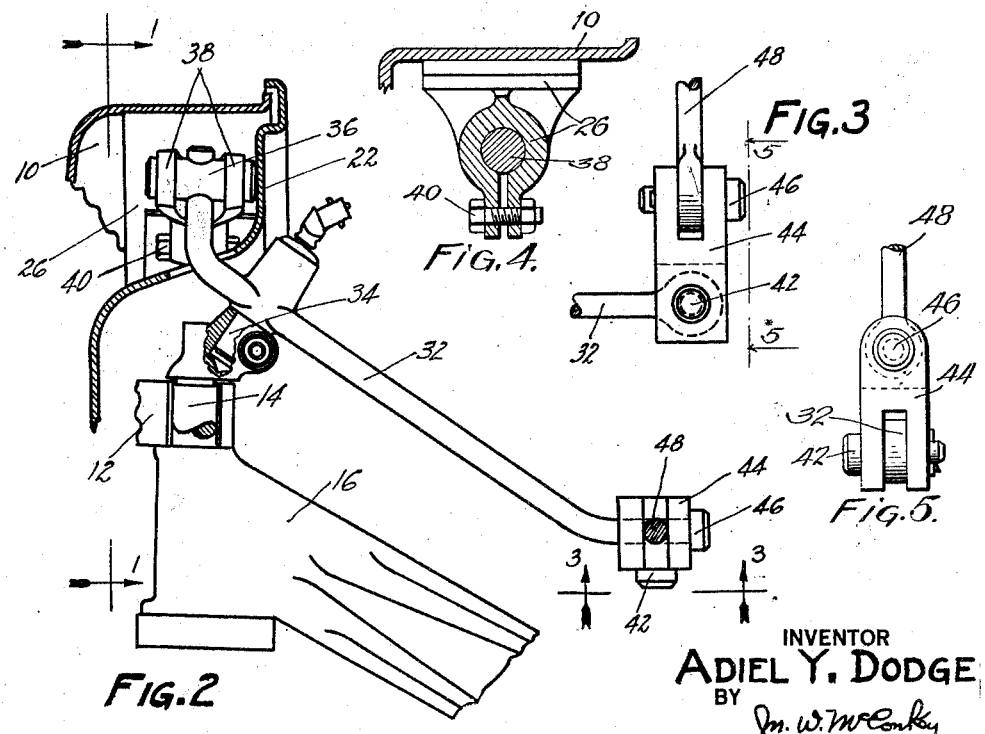
INVENTOR
ADIEL Y. DODGE
BY
m. W. McConkey
ATTORNEY Patented July 3, 1928.

1,675,536

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.

Application filed November 2, 1925. Serial No. 66,266.

This invention relates to brakes, and is illustrated as embodied in novel operating mechanism for a brake for a swivelled wheel.

One feature of the invention has to do with a novel joint, embodying in itself substantial novelty, and positively connecting a brake-applying lever or the like directly to a friction device swivelling with the wheel. Preferably the lever is generally horizontal,—i. e. it extends generally perpendicular to the wheel,—and the joint is moved in applying the brake substantially into the swivelling axis of the wheel.

The joint itself, in the form illustrated in the drawing, includes a thrust member forked to form arms having openings for a cylindrical connector having a cross bore pivotally to receive the end of the lever or its equivalent.

Other features of the invention relate to an improved and simplified coupling between the inner end of the lever and the end of the brake-applying connections, and to other novel combinations of parts and desirable particular constructions which will be apparent from the following description of one illustrative embodiment shown in the accompanying drawings, in which:

Fig. 1 is a vertical longitudinal section through the brake, just inside the wheel, on the line 1—1 of Fig. 2;

Fig. 2 is a vertical transverse section through the upper part of the brake, on the line 2—2 of Fig. 1, and on a larger scale than Fig. 1;

Fig. 3 is a bottom plan view of the connection at the inner end of the lever, looking in the direction of the arrows 3—3, Fig. 2;

Fig. 4 is a section on the line 4—4 of Fig. 1; and

Fig. 5 is a partial elevation on the line 5—5 of Fig. 3.

The illustrated brake includes a drum 10 rotating with a wheel (not shown) rotatably mounted on the spindle of a knuckle 12 swivelled by a king-pin 14 or the like at the end of an axle 16. The brake proper consists of a shoe 18 anchored at 20 on a backing plate 22 carried by the knuckle 12, and to which is pivotally connected at 24 a floating or servo shoe 26. A spring 28 holds shoe 18 away from the drum until overcome by movement of shoe 26 with the drum, while shoe 26 is urged away from the drum by a suitable return spring 30.

The brake is applied by means such as a lever 32 generally paralleling the axle,— i. e. a lever extending generally perpendicular to the plate of the wheel,—fulcrumed between its ends on a pivot pin 34 clamped in an inclined socket formed in the head of king-pin 14.

The brake-applying outer end of lever 32 extends vertically, and has pivoted thereon a cylindrical connector 36, which in turn is received in coaxial openings in arms formed by forking the end of a novel thrust member 38.

Thrust member 38 is shown with a stem adjustably threaded into a split sleeve integrally formed in the end of shoe 26, and secured in adjusted position by contracting the split sleeve by a clamp screw 40.

It will be seen that the above-described parts form a novel universal joint positively connecting lever 32 directly to the end of the friction means 26—18. This joint is moved in applying the brake at right angles to the swivelling axis of the wheel substantially into that axis.

At its inner end, lever 32 is horizontally flattened, and is pivoted by a pin 42 between vertically spaced jaws forming part of a novel connecting member 44. Just behind lever 32, member 44 has horizontally-spaced jaws, between which a pin 46 pivotally connects the flattened end of a brake rod 48 or the like.

While one illustrative embodiment of the invention has been described in detail, it is not my intention to limit its scope to that particular embodiment, or otherwise than by the terms of the appended claims.

I claim:

1. Brake mechanism comprising, in combination, a friction device having a thrust member forked to provide arms formed with coaxial openings, a cylindrical connector sleeved in said openings and formed with a central cross bore, and an operating member having a part received in said cross bore.

2. Brake mechanism comprising, in combination, a friction device having a lengthwise adjustable thrust member forked to provide arms formed with coaxial openings, means for clamping said member to preserve its adjustments, a cylindrical connector sleeved in said openings and formed with a central cross bore, and an operating member having a part received in said cross bore.

3. Brake mechanism comprising, in combination, a friction device having a thrust member forked to provide arms formed with coaxial openings and having a stem threaded into the end of the friction member; a cylindrical connector sleeved in said openings and formed with a central cross bore, and an operating member having a part received in said cross bore.

4. Brake mechanism for a swivelled wheel comprising, in combination, a friction device swivelling with the wheel and having a thrust member forked to provide arms formed with coaxial openings, a cylindrical connector sleeved in said openings and formed between the arms with a vertical bore, and an operating member projecting into said bore, the axis of the vertical bore being when the brake is applied substantially at the swivelling axis of the wheel.

5. Brake mechanism for a swivelled wheel comprising, in combination, a friction device swivelling with the wheel, a separately-supported operating member having a vertical cylindrical portion in the swivelling axis of the wheel at least when the brake mechanism is applied, and a member pivoted on said portion and positively connected to the friction device.

6. Brake mechanism for a swivelled wheel comprising, in combination, a friction device swivelling with the wheel, a separately-supported operating member, and a part pivoted to the operating member for movement about an axis paralleling the swivelling axis of the wheel and pivoted to the friction device for movement about an axis perpendicular to the swivelling axis of the wheel and moved in applying the brake at right angles to the swivelling axis of the wheel to an active position substantially in that axis.

7. Brake mechanism for a swivelled wheel comprising, in combination, a friction device swivelling with the wheel, a brake-operating lever generally perpendicular to the wheel, and a connecting part positively pivoted to the end of the lever and positively pivoted to the friction device and arranged when the brake is applied in the swivelling axis of the wheel.

8. Brake mechanism for a swivelled wheel comprising, in combination, a friction device swivelling with the wheel and having a thrust member forked to form spaced arms having opposite openings, a connector received in said openings and having a vertical bore between said arms, and a lever having a vertical end received in said bore and arranged when the brake is applied substantially in the swivelling axis of the wheel.

9. Brake mechanism for a swivelled wheel comprising, in combination, friction means swivelling with the wheel, a generally horizontal lever having its brake-applying end movable in applying the brake from an idle position spaced from the swivelling axis of the wheel to an active position substantially in that axis and having its other inner end horizontally flattened, a connecting member having vertically spaced jaws embracing and pivoted to said flattened end and having rearwardly thereof horizontally spaced jaws, and a pull member having a flattened end embraced and pivoted between the horizontally spaced jaws.

10. Brake mechanism comprising, in combination, friction means, a generally horizontal brake-applying lever having its inner end horizontally flattened, a connecting member having vertically spaced jaws embracing and pivoted to said flattened end and having rearwardly thereof horizontally spaced jaws, and a pull member having a flattened end embraced and pivoted between the horizontally spaced jaws.

In testimony whereof, I have hereunto signed my name.

ADIEL Y. DODGE.